United States Patent
Qi et al.

(10) Patent No.: US 9,641,607 B2
(45) Date of Patent: *May 2, 2017

(54) APPARATUS, SYSTEM AND METHOD OF SETTING UP AN APPLICATION SERVICE PLATFORM (ASP) PEER TO PEER (P2P) GROUP

(71) Applicant: INTEL CORPORATION, Santa Clara, CA (US)

(72) Inventors: Emily H. Qi, Camas, WA (US); Carlos Cordeiro, Portland, OR (US); Ganesh Venkatesan, Hillsboro, OR (US); Bahareh Sadeghi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,095

(22) Filed: Feb. 21, 2016

(65) Prior Publication Data
US 2016/0173587 A1    Jun. 16, 2016

Related U.S. Application Data

(63) Continuation of application No. 14/718,321, filed on May 21, 2015, now Pat. No. 9,277,008, which is a
(Continued)

(51) Int. Cl.
*G06F 15/16* (2006.01)
*H04L 29/08* (2006.01)
(Continued)

(52) U.S. Cl.
CPC .......... *H04L 67/1046* (2013.01); *H04L 41/00* (2013.01); *H04L 67/10* (2013.01);
(Continued)

(58) Field of Classification Search
None
See application file for complete search history.

(56) References Cited

U.S. PATENT DOCUMENTS 9,131,353 B2    9/2015  Qi et al.
9,277,008 B2    3/2016  Qi et al.
(Continued)

FOREIGN PATENT DOCUMENTS

JP    2011114708    6/2011
KR    20120119959   11/2012
(Continued)

OTHER PUBLICATIONS

Office Action for U.S. Appl. No. 14/028,742, mailed on Sep. 29, 2014, 32 pages.
(Continued)

*Primary Examiner* — Edan Orgad
*Assistant Examiner* — Rebecca Song
(74) *Attorney, Agent, or Firm* — Shichrur & Co.

(57) ABSTRACT

Some demonstrative embodiments include apparatuses, systems and/or methods of setting up an Application Service Platform (ASP) Peer-to-Peer (P2P) persistent group. For example, an apparatus may include a first ASP to communicate with a second ASP to setup one or more ASP-P2P groups over a wireless communication link, the first ASP is to form each ASP-P2P group only as an ASP-P2P persistent group extendable over a plurality of distinct sessions, the first ASP is to store credentials of the ASP-P2P persistent group for use during the sessions.

21 Claims, 4 Drawing Sheets

Related U.S. Application Data continuation of application No. 14/028,742, filed on Sep. 17, 2013, now Pat. No. 9,131,353.

(60) Provisional application No. 61/820,996, filed on May 8, 2013.

(51) Int. Cl.
| | | |
|---|---|---|
| *H04W 4/08* | (2009.01) | |
| *H04W 8/00* | (2009.01) | |
| *H04L 12/24* | (2006.01) | |
| *H04W 76/02* | (2009.01) | |
| *H04W 84/12* | (2009.01) | |
| *H04W 92/18* | (2009.01) | |
| *H04W 12/06* | (2009.01) | |

(52) U.S. Cl.
CPC ...... *H04L 67/1044* (2013.01); *H04L 67/1063* (2013.01); *H04L 67/1068* (2013.01); *H04L 67/1093* (2013.01); *H04L 67/141* (2013.01); *H04W 4/08* (2013.01); *H04W 8/005* (2013.01); *H04L 67/104* (2013.01); *H04W 12/06* (2013.01); *H04W 76/02* (2013.01); *H04W 84/12* (2013.01); *H04W 92/18* (2013.01)

(56) References Cited

U.S. PATENT DOCUMENTS

| | | | |
|---|---|---|---|
| 2004/0031038 A1 | 2/2004 | Hugly et al. | |
| 2011/0161697 A1 | 6/2011 | Qi et al. | |
| 2011/0185200 A1 | 7/2011 | Sim et al. | |
| 2011/0276633 A1 | 11/2011 | Marchisio et al. | |
| 2012/0044815 A1 | 2/2012 | Geirhofer et al. | |
| 2012/0063335 A1 | 3/2012 | Cho et al. | |
| 2012/0134349 A1 | 5/2012 | Jung et al. | |
| 2013/0034023 A1 | 2/2013 | Jung | |
| 2013/0065627 A1* | 3/2013 | Jung | H04W 76/023 455/515 |
| 2013/0162523 A1* | 6/2013 | Tomaszewski | G06F 3/1454 345/156 |
| 2013/0294434 A1 | 11/2013 | Lee | |
| 2014/0091987 A1 | 4/2014 | Lee et al. | |
| 2014/0128063 A1* | 5/2014 | Chhabra | H04M 15/7652 455/435.1 |
| 2014/0146745 A1 | 5/2014 | Huang et al. | |
| 2014/0201415 A1 | 7/2014 | Huang et al. | |
| 2014/0223019 A1 | 8/2014 | McCann et al. | |
| 2014/0314059 A1 | 10/2014 | Yoon et al. | |
| 2014/0334464 A1 | 11/2014 | Qi et al. | |
| 2015/0245393 A1* | 8/2015 | Lee | H04W 8/005 370/338 |

FOREIGN PATENT DOCUMENTS

| | | |
|---|---|---|
| WO | 20120144707 | 10/2012 |
| WO | 2012173423 | 12/2012 |

OTHER PUBLICATIONS

Notice of Allowance for U.S. Appl. No. 14/028,742, mailed on May 4, 2015, 13 pages.
IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012. 2793 pages.
IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012. 628 pages.
Wi-Fi Alliance Technical Committee P2P Task Group; Wi-Fi Peer-to-Peer (P2P) Technical Specification; Version 1.2; Dec. 14, 2011; 160 pages.
International Search Report and Written Opinion for International Patent Application No. PCT/US2014/037258, mailed on Sep. 1, 2014, 12 pages.
Final Office Action for U.S. Appl. No. 14/028,742, mailed on Feb. 20, 2015, 34 pages.
International Preliminary Report on Patentability for PCT/US2014/037258, mailed on Nov. 19, 2015, 9 pages.
Notice of Allowance for U.S. Appl. No. 14/718,321, mailed on Oct. 14, 2015, 14 pages.
Office Action for Korean Patent Application No. 2015-7016012, mailed on Aug. 23, 2016, 9 pages. (Including 4 pages of English translation).
Office Action for Japanese Patent Application Serial No. 2015-549874, mailed on Jun. 21, 2016, 10 pages (Including 5 pages of English translation).
Office Action for Japanese Patent Application No. 2015-549874, mailed on Oct. 25, 2016, 6 pages. (Including 3 pages of English translation).
Extended European Search Report for Patent Application No. 14795095.0, mailed on Nov. 30, 2016, 11 pages.

* cited by examiner

APPARATUS, SYSTEM AND METHOD OF SETTING UP AN APPLICATION SERVICE PLATFORM (ASP) PEER TO PEER (P2P) GROUP

CROSS REFERENCE

This application is a Continuation Application of U.S. patent application Ser. No. 14/718,321, filed on May 21, 2015, which is a Continuation Application of U.S. patent application Ser. No. 14/028,742, filed on Sep. 17, 2013, which in turn claims the benefit of and priority from U.S. Provisional Patent Application No. 61/820,996 entitled "Techniques of Invoking Persistent P2P group For Application Service Platform (ASP)", filed on May 8, 2013, the entire disclosures of which are incorporated herein by reference.

TECHNICAL FIELD

Embodiments described herein generally relate to an apparatus, system and method of setting up an Application Service Platform (ASP) Peer-to-Peer (P2P) group.

BACKGROUND

A first wireless communication device may be capable of providing one or more services to a second wireless communication device. For example, the first wireless communication device may provide printing services, display services, Internet access services, and/or any other service to the second wireless communication device.

Wireless Fidelity (Wi-Fi) Direct technology provides a Peer-to-Peer (P2P) connectivity to connect between the first and second devices, e.g., to share, show, print, and/or synchronize content.

The Wi-Fi Direct technology provides link-layer connectivity, which may not support interoperability between services and/or applications from multiple, e.g., different, vendors. As a result, users may experience inconsistency when using a service from a remote device, e.g., due to the lack of interoperability between a device providing services and a device running applications and/or a complexity of the P2P topology.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
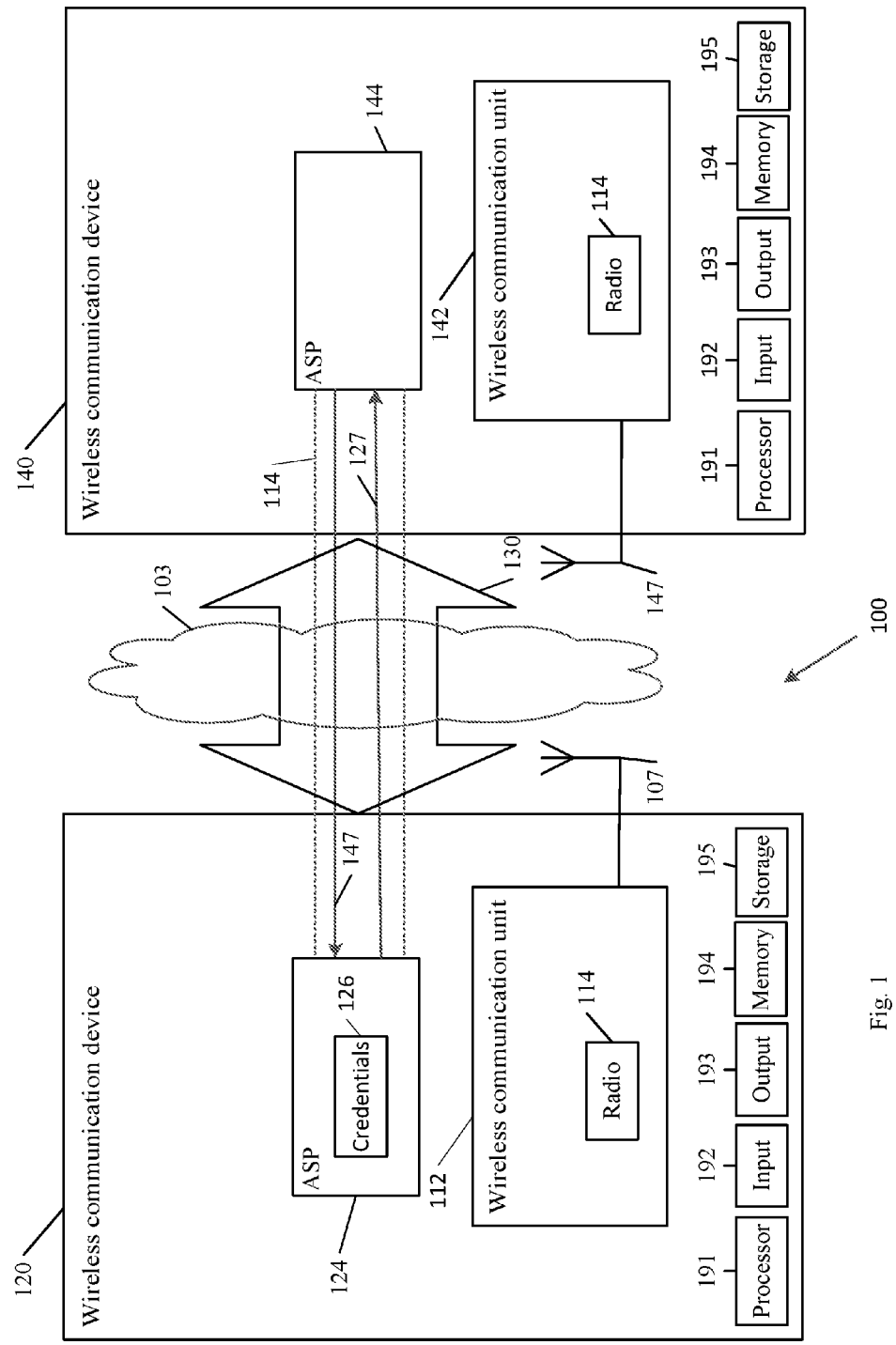
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11 ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012*)) and/or future versions and/or derivatives thereof, devices and/or networks operating in accordance with existing WirelessHD™ specifications and/or future versions and/or derivatives thereof, devices and/or networks operating in accordance with existing WiFi Alliance (WFA) Peer-to-Peer (P2P) specifications (WiFi P2P technical specification, version 1.3, 2012) and/or future versions and/or derivatives thereof, devices and/or networks operating in accordance with existing Wireless Serial Bus (WSB) specifications and/or future versions and/or derivatives thereof units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 120 and/or 140, capable of communicating content, data, information and/or signals over a wireless communication medium (WM) 103, for example, a radio channel, an IR channel, an RF channel, a Wireless Fidelity (WiFi) channel, and the like. One or more elements of system 100 may optionally be capable of communicating over any suitable wired communication links.

In some demonstrative embodiments, wireless communication devices 120 and/or 140 may include, for example, a PC, a desktop computer, a mobile computer, a laptop computer, a notebook computer, a tablet computer, an Ultrabook™ computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 120 and/or 140 may include wireless communication units 112 and/or 142, respectively, to perform wireless communication between wireless communication devices 120 and/or 140 and/or with one or more other wireless communication devices, e.g., as described below.

In some demonstrative embodiments, wireless communication devices 120 and/or 140 may also include, for example, one or more of a processor 191, an input unit 192, an output unit 193, a memory unit 194, and a storage unit 195. Wireless communication devices 120 and/or 140 may optionally include other hardware components and/or software components. In some demonstrative embodiments, some or all of the components of one or more of wireless communication devices 120 and/or 140 may be enclosed in a common housing or packaging, and may be interconnected or operably associated using one or more wired or wireless links. In other embodiments, components of one or more of wireless communication devices 120 and/or 140 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 120 and/or 140 and/or of one or more applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 120 and/or 140.

In some demonstrative embodiments, wireless communication units 112 and/or 142 may include, or may be associated with, one or more antennas 107 and/or 147, respectively. Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a single element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication units 112 and/or 142 include, for example, one or more radios 114, e.g., including one or more wireless transmitters, receivers and/or transceivers able to send and/or receive wireless communication signals, RF signals, frames, blocks, transmission streams, packets, messages, data items, and/or data. For example, wireless communication units 112 and/or 142 may include or may be implemented as part of a wireless Network Interface Card (NIC), and the like.

In some demonstrative embodiments, wireless communication medium 103 may include a wireless P2P link. For example, devices 120 and/or 140 may perform the functionality of a P2P client or a P2P group owner (GO).

In some demonstrative embodiments, wireless communication medium 103 may include a WiFi direct link.

In some demonstrative embodiments, wireless communication medium 103 may include any other suitable link.

In some demonstrative embodiments, devices 120 and/or 140 may be configured to provide one or more services to one or more remote devices. For example, device 120 may be configured to provide printing services, display services, Internet access services and/or any other services to device 140.

In some demonstrative embodiments, devices 120 and/or 140 may be configured to advertize the one or more services, for example, to enable the remote devices to find the services. For example, device 120 may be configured to advertise one or more of the services provided by device 120 to enable device 140 to discover the services provided by device 120.

In some demonstrative embodiments, devices 120 and/or 140 may be configured to utilize the one or more services from the remote devices. For example, device 140 may be configured to utilize the services from device 120.

In some demonstrative embodiments, devices 120 and/or 140 may be configured to connect to a device to receive the service provided by the device. For example, device 140 may be configured to connect to device 120 to receive the services provided by device 120.

In some demonstrative embodiments, devices 120 and 140 may establish a P2P connection between devices 120 and 140 over wireless communication medium 103 to connect between devices 120 and 140, and to provide the one or more services between devices 120 and 140.

In some demonstrative embodiments, devices 120 and 140 may establish any other connection between devices 120 and 140 over wireless communication medium 103.

In some demonstrative embodiments, devices 120 and/or 140 may include an Application Service Platform (ASP) configured to manage the procedure of receiving and/or providing the one or more services, e.g., according to a predefined protocol.

In some demonstrative embodiments, device 120 may include an ASP 124, and/or device 140 may include an ASP 144, configured to manage an ASP-session between devices 120 and 140.

In some demonstrative embodiments, ASP 124 and/or ASP 144 may include a software module and/or a library module that implements functions required for managing the procedure of receiving and/or providing the one or more services. For example, the functions may include discovery of a service, session management, connection topology management, security management and/or any other function to support management of the services. In other embodiments, ASP 124 and/or ASP 144 may be implemented using any other module and/or configuration.

In some demonstrative embodiments, ASP 124 and ASP 144 may be configured to establish one or more ASP-sessions between devices 120 and 140 over the P2P connection. The ASP-session may be utilized, for example, to provide the one or more services between devices 120 and 140.

In some demonstrative embodiments, an ASP-session may include a logical link between ASP 124 and 144, e.g., over the P2P connection between devices 120 and 140. The ASP-session may be configured, for example, to manage the procedure of providing a service between devices 120 and 140.

In some demonstrative embodiments, ASP 124 and/or ASP 144 may not be able to establish the one or more ASP-sessions, for example, if devices 120 and/or 140 do not establish the P2P connection between devices 120 and/or 140, e.g., prior to establishing the ASP-sessions.

In some demonstrative embodiments, ASP 124 and/or ASP 144 may not be able to establish the one or more ASP-sessions over the P2P connection, for example, if devices 120 and 140 are not part of an ASP-P2P group.

In some demonstrative embodiments, ASP 124 and/or 144 may setup an ASP-P2P group between ASP 124 and ASP 144 to establish the ASP-session and/or the P2P connection between ASP 124 and 144.

In some demonstrative embodiments, the ASP-P2P group may include a group formed by an ASP, e.g., ASP 124 and/or 144, and may include a set of devices including a P2P group owner (GO) and zero or more clients. For example, the ASP-P2P group may include one of devices 120 and 140, e.g., device 120, to perform the functionality of the GO, and another one of devices 120 and 140, e.g., device 140, to perform the functionality of the client.

In some demonstrative embodiments, establishing the ASP-session between devices of the ASP-P2P group may require users of the devices to perform a provisioning procedure. For example, the users of the one or more devices of the ASP-P2P group may perform the provisioning procedure, for example, to assure that the correct devices are forming the ASP-P2P group.

In one example, the devices may utilize a WiFi simple configuration (WSC) procedure to perform the provisioning procedure.

In some demonstrative embodiments, ASP 124 and/or ASP 144 may form one or more ASP-P2P groups based on one or more requests to establish one or more ASP-sessions.

In one example, ASP 124 and/or ASP 144 may establish the one or more ASP-sessions between devices 120 and 140 to provide one or more services between devices 120 and 140.

In some demonstrative embodiments, ASP 124 and ASP 144 may exchange credentials, e.g., during a provisioning phase.

In some demonstrative embodiments, the credentials may include information, which may be required to join an ASP-P2P group. For example, the credentials may include a data structure, which may enable gaining access to the ASP-P2P group. In one example, the credentials may include, for example, a WiFi Protected Access (WPA) personal pre-shared key (PSK). In other embodiments, the credentials may include any other data and/or information.

In some demonstrative embodiments, a persistent group may be a P2P group between a first and second devices in which credentials are stored by the first and/or the second devices and may be made available for reuse after an initial use, e.g., of an ASP-session. The persistent group may have a lifetime, which may extend over a number of distinct ASP-sessions after the initial use until the persistent group is deliberately dissolved, e.g., by ASP 124 and/or 144.

In some demonstrative embodiments, the users of the one more devices 120 and/or 140 may be required to repeatedly perform the provisioning procedure for each ASP-session between devices 120 and 140, for example, if the ASP-P2P group is not formed as an ASP-P2P persistent group. This repeated provisioning may be inconvenient and/or may reduce user experience.

In some demonstrative embodiments, an ASP-P2P group may always be formed as an ASP-P2P persistent group, e.g., as described below.

In some demonstrative embodiments, forming the ASP-P2P group as an ASP-P2P persistent group may obviate the provisioning procedure for establishing another ASP-session between devices of the ASP-P2P persistent group, for example, after forming the ASP-P2P persistent group, e.g., as described below.

In some demonstrative embodiments, ASP 124 may communicate with ASP 144 to setup one or more ASP-P2P groups over wireless communication link 103.

In some demonstrative embodiments, ASP 124 may form each ASP-P2P group only as an ASP-P2P persistent group 130 extendable over a plurality of distinct ASP-sessions.

In some demonstrative embodiments, ASP 124 may autonomously start ASP-P2P persistent group 130 as a group owner (GO).

In some demonstrative embodiments, ASP 124 and/or 124 may setup ASP-P2P persistent group 130 as part of GO negotiation between ASP 124 and 144.

In some demonstrative embodiments, ASP 124 may communicate with ASP 144 a P2P capability attribute including a group capability map.

In some demonstrative embodiments, the group capability map may include a persistent group bit always set to indicate that the ASP-P2P group is to be formed as ASP-P2P persistent group 130.

In one example, a persistent P2P group bit may always be set to a predefined value, e.g., "1", to indicate the ASP-P2P group is an ASP-P2P persistent group. For example, a P2P capability attribute may be communicated during a group formation procedure. The P2P capability attribute may include a group capability bitmap field including the persistent P2P group bit set to the predefined value.

In some demonstrative embodiments, ASP 124 may store credentials 126 of ASP-P2P persistent group 130 for use during one or more additional ASP-sessions, e.g., subsequent to an ASP-session formed when setting up ASP-P2P persistent group 130.

In some demonstrative embodiments, ASP 124 may store credentials 126 in memory 129 and/or storage 195.

In some demonstrative embodiments, ASP 144 may store credentials 146 of ASP-P2P persistent group 130 for use during the ASP-sessions.

In some demonstrative embodiments, ASP 144 may store credentials 146 in memory 129 and/or storage 195.

In some demonstrative embodiments, ASP 124 may assign a group identifier to identify ASP-P2P persistent group 130.

In some demonstrative embodiments, a different group identifier may be used for identifying different ASP-P2P persistent groups.

In some demonstrative embodiments, the group identifier of ASP-P2P persistent group 130 may not be changed and/or may remain the same during a lifetime of ASP-P2P persistent group 130.

In some demonstrative embodiments, ASP 124 may store, e.g., in storage 195, the group identifier of ASP-P2P persistent group 130 in association with credentials 126 of ASP-P2P persistent group 130.

In some demonstrative embodiments, ASP 144 may store, e.g., in storage 195, the group identifier of ASP-P2P persistent group 130 in association with credentials 146 of ASP-P2P persistent group 130.

In some demonstrative embodiments, storing credentials 126 and/or 146 in association with the group identifier of ASP-P2P persistent group 130 may enable ASP 124 and/or 144 to invoke ASP-P2P persistent group 130 for the one or more additional sessions, e.g., as described below.

In some demonstrative embodiments, ASP 124 may communicate with ASP 144 to setup the P2P connection for an ASP-session 114 using credentials 126 and/or 146 of ASP-P2P persistent group 130.

In some demonstrative embodiments, ASP 124 may communicate with ASP 144 a provision discovery request 147 and a provision discovery response 127 to setup ASP session 114. Provision discovery response 127 may be in response to provision discovery request 147.

In some demonstrative embodiments, ASP 144 may transmit provision discovery request 147.

In some demonstrative embodiments, provision discovery request 147 may include an indication of an intent to use ASP-P2P persistent group 130.

In some demonstrative embodiments, provision discovery request 147 may include the group identifier of ASP-P2P persistent group 130, e.g., to identify the ASP-P2P persistent group, which ASP 144 intends to use.

In some demonstrative embodiments, provision discovery request 147 may indicate ASP 144 has credentials 146 available.

In some demonstrative embodiments, a P2P interface address may not be the same for each ASP-session. For example, the P2P interface address of ASP-session 114 may be different from a P2P interface address of another, e.g., different, ASP-session.

In some demonstrative embodiments, the P2P interface address may be used for ASP 124 and/or ASP 144 to identify devices within ASP-P2P persistent group 130, e.g., devices 120 and/or 140.

In some demonstrative embodiments, provision discovery request 147 and/or provision discovery response 127 may include the P2P interface address to be used be devices 120 and/or 140 during ASP-session 114.

In some demonstrative embodiments, an operating channel to communicate over the P2P connection may not be the same for each ASP-session. For example, the operating channel of ASP-session 114 may be different from an operating channel of another, e.g., different, ASP-session over the P2P connection.

In some demonstrative embodiments, provision discovery request 147 and/or provision discovery response 127 may include the operating channel to be used within ASP-P2P persistent group 130. For example, provision discovery request 147 and/or provision discovery response 127 may include an operating channel attribute, which may indicate the intended or the current operating channel of ASP-P2P persistent group 130, in which devices, e.g., device 120 or 140, of ASP-P2P persistent group 130 may communicate.

In some demonstrative embodiments, ASP 124 may receive provision discovery request 147 and may transmit provision discovery response 127 to ASP 144, e.g., in response to provision discovery request 147.

In some demonstrative embodiments, provision discovery response 127 may include an indication of a confirmation of ASP 124 to use ASP-P2P persistent group 130.

In some demonstrative embodiments, provision discovery response 127 may indicate that ASP 124 has credentials 126 available.

In some demonstrative embodiments, ASP 124 may use, e.g., invoke, ASP-P2P persistent group 130 and may establish and/or open ASP-session 114 utilizing the operating channel and the P2P interface address indicated by provision discovery request 147, for example, upon transmitting the indication of confirmation, e.g., in provision discovery response 127.

In some demonstrative embodiments, ASP 124 and/or ASP 144 may form a new ASP-P2P persistent group, for example, if ASP 124 does not have credentials 126 available and/or if ASP 124 does not confirm to use ASP-P2P persistent group 130.

In one example, provision discovery request 147 and/or provision discovery response 127 may include a persistent P2P group invocation flag bit.

In some demonstrative embodiments, the persistent P2P group invocation flag bit in provision discovery request 147 may be set to a first value, e.g., "1", for example, to indicate device 140 has credentials 146 available and intends to invoke ASP-P2P persistent group 130.

In some demonstrative embodiments, the persistent P2P group invocation flag bit in provision discovery request 147 may be set to a second value, e.g., "0", for example, if device 140 does not have credentials 146 available and/or if device 140 does not intend to invoke ASP-P2P persistent group 130.

In some demonstrative embodiments, the persistent P2P group invocation flag bit in provision discovery response 127 may be set to the first value, e.g., "1", for example, to indicate that device 120 has credentials 126 available, and to confirm that ASP-P2P persistent group 130 having the ASP-P2P group identifier, which was specified in provision discovery request 147, will be invoked.

In some demonstrative embodiments, the persistent P2P group invocation flag bit in provision discovery response 127 may be set to the second value, e.g., "0", for example, if device 120 does not have credentials 126 available and/or if ASP 124 does not intend to invoke ASP-P2P persistent group 130.

In some demonstrative embodiments, ASP 124 and 144 may perform the WSC provisioning procedure, for example, if ASP 124 and/or ASP 144 intend to form a new ASP-P2P persistent group and/or if credentials 126 and/or 146 are not available.

In some demonstrative embodiments, the persistent P2P group invocation flag bit may be part of a connection capability attribute, e.g., bit 3 of a connection capability attribute of provision discovery request 147 and/or provision discovery response 127. In other embodiments, the persistent P2P group invocation flag bit may be part of a new attribute or an ASP extension attribute.

In one example, ASP 124 and ASP 144 may form ASP-P2P persistent group 130 to establish an ASP-session to provide a printing service from device 120 to device 140. ASP 124 may store credentials 126 corresponding to the group identifier of ASP-P2P persistent group 130, and/or ASP 144 may store credentials 146 corresponding to the group identifier of ASP-P2P persistent group 130.

In some demonstrative embodiments, ASP 124 and/or ASP 144 may close the ASP-session, for example, when device 140 completes utilizing the printing service.

In some demonstrative embodiments, ASP 144 may request to open a new ASP session, e.g., ASP-session 114, to utilize a display service from device 120.

In some demonstrative embodiments, ASP 144 may transmit provision discovery request 147 to open ASP-session 114. Provision discovery request 147 may indicate the intent to use ASP-P2P persistent group 130 for ASP-session 114.

In some demonstrative embodiments, ASP 124 may receive provision discovery request 147, and may invoke ASP-P2P persistent group 130 to establish ASP-session 114, e.g., utilizing credentials 126 and 146, to provide the display service.

In some demonstrative embodiments, ASP 124 may be able to invoke ASP-P2P persistent group 130, for example, only if credentials 126 and/or 146 are available.

In some demonstrative embodiments, ASP 124 and/or 144 may not need to perform the provisioning procedure, for example, upon invoking ASP-P2P persistent group 130, for example, since credentials 126 and/or 146 are available.

In some demonstrative embodiments, forming each ASP-P2P group as an ASP-P2P persistent group, e.g., group 130, may eliminate the provisioning procedure, which may reduce setup-time for establishing an additional ASP session, e.g., ASP-session 114.

In some demonstrative embodiments, reducing the setup-time may increase performance and/or may reduce power consumption of devices 120 and/or 140.

Figure 2:
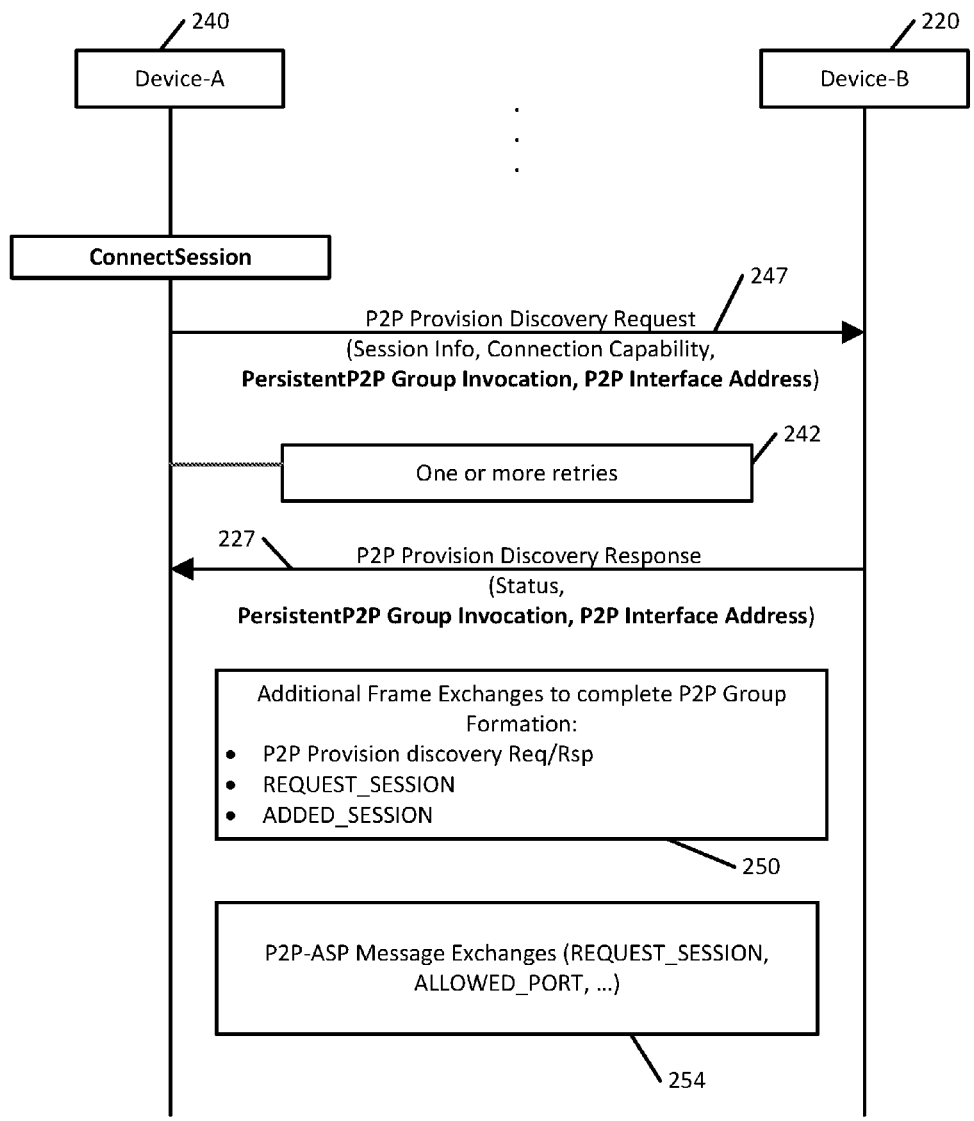
FIG. 2 is a sequence diagram of operations between a first wireless communication device and a second wireless communication device, in accordance with some demonstrative embodiments.

Reference is made to FIG. 2, which schematically illustrates a sequence of operations between a first wireless communication device 240 and a second wireless communication device 220, in accordance with some demonstrative embodiments. For example, device 220 may perform the functionality of device 120 (FIG. 1) and/or device 240 may perform the functionality of device 140 (FIG. 1).

In some demonstrative embodiments, device 240 may request to open an ASP session between devices 240 and 220, e.g., to provide a service from device 220 to device 240.

As shown in FIG. 2, device 240 may transmit a P2P provision discovery request message 247 to request to open the ASP session. For example, provision discovery message 247 may perform the functionality of provision discovery message 147 (FIG. 1).

As shown in FIG. 2, P2P provision discovery request message 247 may include a session info field, a connection capability field, a persistent P2P group invocation field, and/or a P2P interface address. For example, the P2P group invocation field may include an indication of an intent to use an ASP-P2P persistent group; the connection capability field may include the persistent group bit set to one to indicate the ASP-P2P group is to be formed as an ASP-P2P persistent group; and/or the P2P interface address field may include the P2P interface address of the requested ASP-session, e.g., as described above.

As shown in FIG. 2, device 240 may retransmit (242) provision discovery request message 247, for example, if device 220 does not receive provision discovery message 247.

As shown in FIG. 2, device 220 may receive provision discovery request message 247 and may transmit a provision discovery response message 227 in response to provision discovery request message 247. For example, provision discovery response message 227 may perform the functionality of provision discovery response message 127 (FIG. 1).

As shown in FIG. 2, provision discovery response message 227 may include a persistent P2P group invocation field, and/or a P2P interface address. For example, the P2P group invocation field may include the indication of conformation to use the ASP-P2P persistent group, and/or the P2P interface address field may include the P2P interface address of the requested ASP-session, e.g., as described above.

As shown in FIG. 2, devices 220 and/or 240 may communicate additional frames 250 between devices 220 and/or 240. For example, devices 220 and/or 240 may communicate additional provision discovery request or response frames, a request session message and/or an added session message.

As shown in FIG. 2, devices 220 and/or 240 may communicate P2P-ASP messages 254 between devices 220 and/or 240. For example, devices 220 and/or 240 may communicate a request session message and/or an allowed port message.

Figure 3:
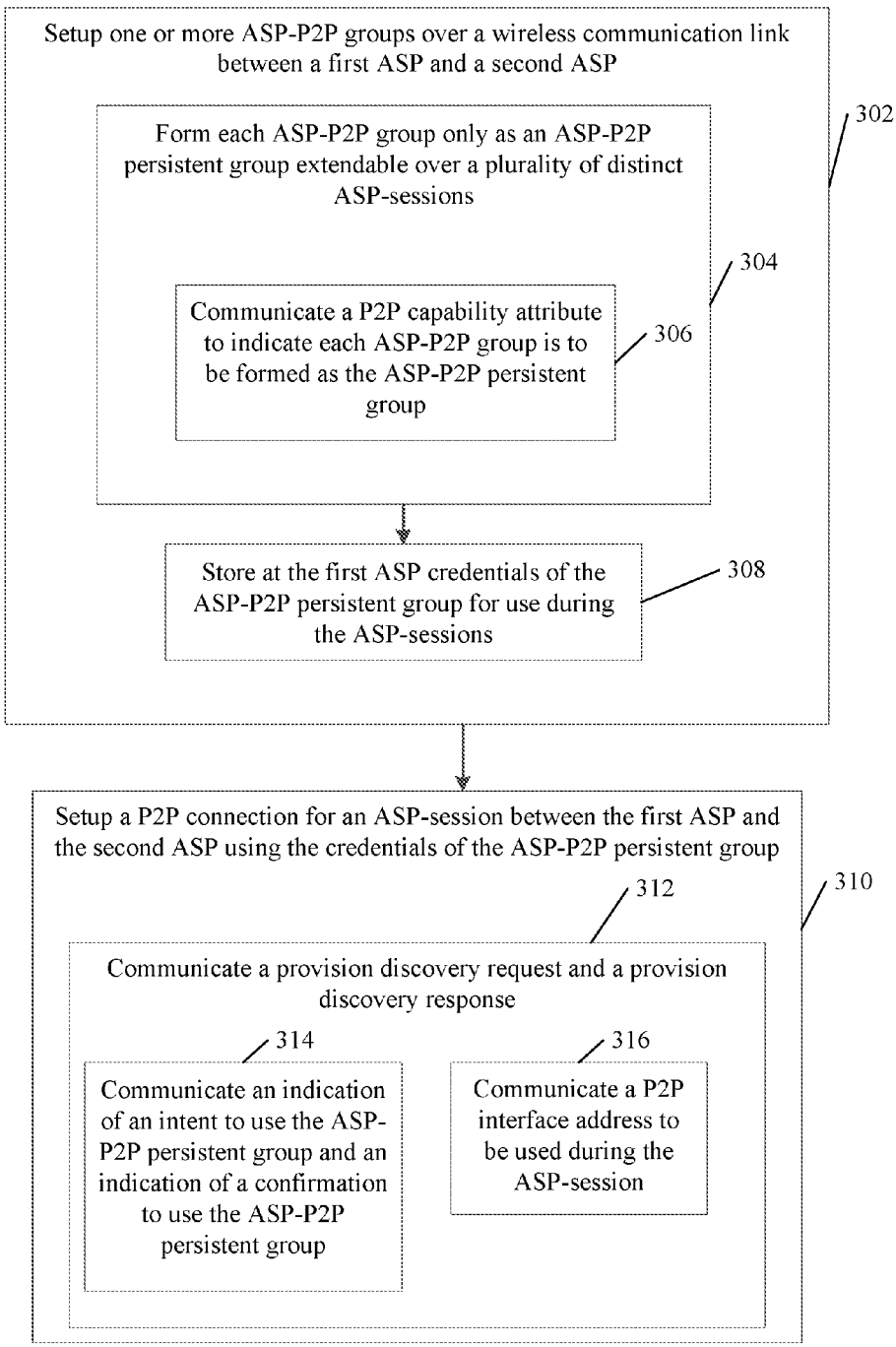
FIG. 3 is a flow chart illustration of a method of setting up an Application Service Platform (ASP) Peer-to-Peer (P2P) group, in accordance with some demonstrative embodiments.

Reference is made to FIG. 3, which schematically illustrates a flow chart of a method of setting up an ASP-P2P group, in accordance with some demonstrative embodiments. For example, one or more of the operations of the method of FIG. 3 may be performed by a wireless communication system, e.g., system 100 (FIG. 1); a wireless communication device, e.g., device 120 (FIG. 1) and/or device 140 (FIG. 1); and/or an ASP, e.g., ASP 124 (FIG. 1), and/or ASP 144 (FIG. 1).

As indicated at block 302, the method may include setting up one or more ASP-P2P groups over a wireless communication link between a first ASP and a second ASP. For example, ASP 124 and ASP 144 (FIG. 1) may setup the one or more ASP-P2P groups over WM 103 (FIG. 1) between ASP 124 and 144 (FIG. 1), e.g., as described above.

As indicated at block 304, setting up the one or more ASP-P2P groups may include forming each ASP-P2P group only as an ASP-P2P persistent group extendable over a plurality of distinct ASP-sessions. For example, ASP 124 (FIG. 1) may setup ASP-P2P persistent group 130 (FIG. 1) extendable over the plurality of distinct ASP-sessions, e.g., as described above.

As indicated at block 306, forming each ASP-P2P group only as the ASP-P2P persistent group may include communicating a P2P capability attribute including a group capability map. The group capability map may include a persistent group bit always set to indicate the ASP-P2P group is to be formed as an ASP-P2P persistent group. For example, ASP 124 (FIG. 1) and ASP 144 (FIG. 1) may communicate the P2P capability attribute including the persistent group bit set to one, e.g., as described above.

As indicated at block 308, setting up the one or more ASP-P2P groups may include storing at the first ASP credentials of the ASP-P2P persistent group for use during the ASP-sessions. For example, ASP 124 (FIG. 1) may store credentials 126 (FIG. 1) for use during the ASP-sessions, e.g., as described above.

As indicated at block 310, the method may include setting up a P2P connection for an ASP-session between the first ASP and the second ASP, the ASP-session using credentials of the ASP-P2P persistent group. For example, ASP 124 and ASP 144 (FIG. 1) may setup ASP session 114 (FIG. 1) using credentials 126 (FIG. 1) of ASP-P2P persistent group 130 (FIG. 1), e.g., as described above.

As indicated at block 312, setting up the P2P connection for an ASP-session may include communicating a provision discovery request and a provision discovery response between the first and second ASPs. The provision discovery response may be in response to the provision discovery request. For example, ASP 124 and ASP 144 (FIG. 1) may communicate provision discovery request 147 (FIG. 1) and provision discovery response 127 (FIG. 1), e.g., as described above.

As indicated at block 314, communicating the provision discovery request and the provision discovery response may include communicating an indication of an intent to use the ASP-P2P persistent group and an indication of a confirmation to use the ASP-P2P persistent group. For example, provision discovery request 147 (FIG. 1) may include an indication of the intention to use ASP-P2P persistent group 130 (FIG. 1) and/or provision discovery response 127 (FIG. 1) may include an indication of the confirmation to use ASP-P2P persistent group 130 (FIG. 1), e.g., as described above.

As indicated at block 316, communicating the provision discovery request and the provision discovery response may include communicating a P2P interface address to be used during the ASP-session. For example, provision discovery request 147 (FIG. 1) and/or provision discovery response 127 (FIG. 1) may include the P2P interface address, e.g., as described above.

Figure 4:
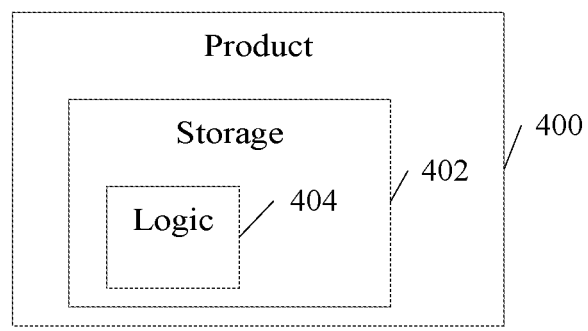
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of device 140 (FIG. 1), device 120 (FIG. 1), ASP 124 (FIG. 1), ASP 144 (FIG. 1), and/or to perform one or more operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a first Application Service Platform (ASP) to communicate with a second ASP to setup one or more ASP Peer-to-Peer (P2P) (ASP-P2P) groups over a wireless communication link, the first ASP is to form each ASP-P2P group only as an ASP-P2P persistent group extendable over a plurality of distinct sessions, the first ASP is to store credentials of the ASP-P2P persistent group for use during the sessions.

Example 2 includes the subject matter of Example 1 and optionally, wherein the first ASP is to communicate with the second ASP a P2P capability attribute including a group capability map, the group capability map includes a persistent group bit always set to indicate the ASP-P2P group is to be formed as the ASP-P2P persistent group.

Example 3 includes the subject matter of Example 1 or 2 and optionally, wherein the first ASP is to communicate with the second ASP a provision discovery request and a provision discovery response to set up an ASP-P2P session, the provision discovery response in response to the provision discovery request, the provision discovery request including an indication of an intent to use the ASP-P2P persistent group, and the provision discovery response including an indication of a confirmation to use the ASP-P2P persistent group.

Example 4 includes the subject matter of Example 3 and optionally, wherein the first ASP is to transmit the provision discovery request and to receive the provision discovery response, the provision discovery request to indicate the first ASP has the credentials available.

Example 5 includes the subject matter of Example 3 and optionally, wherein the first ASP is to receive the provision discovery request and to transmit the provision discovery response, the provision discovery response to indicate the first ASP has the credentials available.

Example 6 includes the subject matter of any one of Examples 1-5 and optionally, wherein the first ASP is to communicate with the second ASP a provision discovery request and a provision discovery response to set up an ASP-P2P session, the provision discovery response in response to the provision discovery request, wherein each of the provision discovery request and the provision discovery response includes a P2P interface address to be used within the ASP-P2P persistent group.

Example 7 includes the subject matter of any one of Examples 1-6 and optionally, wherein the first ASP is to communicate with the second ASP a provision discovery request and a provision discovery response to set up an ASP-P2P session, the provision discovery response in response to the provision discovery request, wherein each of the provision discovery request and the provision discovery response includes an operating channel to be used within the ASP-P2P persistent group.

Example 8 includes the subject matter of any one of Examples 1-7 and optionally, wherein the first ASP is to autonomously start the ASP-P2P persistent group as a group owner.

Example 9 includes the subject matter of any one of Examples 1-8 and optionally, wherein the wireless communication link comprises a Wireless-Fidelity (WiFi) Direct link.

Example 10 includes an apparatus comprising a first Application Service Platform (ASP) to communicate with a second ASP to setup a Peer-to-Peer (P2P) connection for an ASP-session using credentials of an ASP-P2P persistent group, the first ASP is to communicate with the second ASP a provision discovery request and a provision discovery response to set up the ASP session, the provision discovery response in response to the provision discovery request, wherein each of the provision discovery request and the provision discovery response includes a P2P interface address to be used during the session.

Example 11 includes the subject matter of Example 10 and optionally, wherein each of the provision discovery request and the provision discovery response includes an operating channel to be used within the ASP-P2P persistent group.

Example 12 includes the subject matter of Example 10 or 11 and optionally, wherein the first ASP is to communicate with the second ASP a P2P capability attribute including a group capability map, the group capability map includes a persistent group bit set to indicate the ASP-P2P persistent group.

Example 13 includes the subject matter of any one of Examples 10-12 and optionally, wherein the provision discovery request includes an indication of an intent to use the ASP-P2P persistent group, and the provision discovery response includes an indication of a confirmation to use the ASP-P2P persistent group.

Example 14 includes the subject matter of any one of Examples 10-13 and optionally, wherein the first ASP is to transmit the provision discovery request and to receive the provision discovery response, the provision discovery request to indicate the first ASP has the credentials available.

Example 15 includes the subject matter of any one of Examples 10-13 and optionally, wherein the first ASP is to receive the provision discovery request and to transmit the provision discovery response, the provision discovery response to indicate the first ASP has the credentials available.

Example 16 includes the subject matter of any one of Examples 10-15 and optionally, wherein the first ASP is to autonomously start the ASP-P2P persistent group as a group owner.

Example 17 includes the subject matter of any one of Examples 10-16 and optionally, wherein the ASP-session comprises a session over a Wireless-Fidelity (WiFi) Direct link.

Example 18 includes a system comprising a first wireless communication device including a wireless communication unit to communicate with a second wireless communication device over a wireless communication link; and a first Application Service Platform (ASP) to communicate with a second ASP of the second wireless communication device to setup one or more ASP Peer-to-Peer (P2P) (ASP-P2P) groups over the wireless communication link, the first ASP is to form each ASP-P2P group only as an ASP-P2P persistent group extendable over a plurality of distinct sessions, the first ASP is to store credentials of the ASP-P2P persistent group for use during the sessions.

Example 19 includes the subject matter of Example 18 and optionally, wherein the first ASP is to communicate with the second ASP a P2P capability attribute including a group capability map, the group capability map includes a persistent group bit always set to indicate the ASP-P2P group is to be formed as the ASP-P2P persistent group.

Example 20 includes the subject matter of Example 18 or 19 and optionally, wherein the first ASP is to communicate with the second ASP a provision discovery request and a provision discovery response to set up an ASP-P2P session, the provision discovery response in response to the provision discovery request, the provision discovery request including an indication of an intent to use the ASP-P2P persistent group, and the provision discovery response including an indication of a confirmation to use the ASP-P2P persistent group.

Example 21 includes the subject matter of Example 20 and optionally, wherein the first ASP is to transmit the provision discovery request and to receive the provision discovery response, the provision discovery request to indicate the first ASP has the credentials available.

Example 22 includes the subject matter of Example 20 and optionally, wherein the first ASP is to receive the provision discovery request and to transmit the provision discovery response, the provision discovery response to indicate the first ASP has the credentials available.

Example 23 includes the subject matter of any one of Examples 18-22 and optionally, wherein the first ASP is to communicate with the second ASP a provision discovery request and a provision discovery response to set up an ASP-P2P session, the provision discovery response in response to the provision discovery request, wherein each of the provision discovery request and the provision discovery response includes a P2P interface address to be used within the ASP-P2P persistent group.

Example 24 includes the subject matter of any one of Examples 18-23 and optionally, wherein the first ASP is to communicate with the second ASP a provision discovery request and a provision discovery response to set up an ASP-P2P session, the provision discovery response in response to the provision discovery request, wherein each of the provision discovery request and the provision discovery response includes an operating channel to be used within the ASP-P2P persistent group.

Example 25 includes the subject matter of any one of Examples 18-24 and optionally, wherein the first ASP is to autonomously start the ASP-P2P persistent group as a group owner.

Example 26 includes the subject matter of any one of Examples 18-25 and optionally, wherein the wireless communication link comprises a Wireless-Fidelity (WiFi) Direct link.

Example 27 includes a system comprising a first wireless communication device including a wireless communication unit to communicate with a second wireless communication device over a wireless communication link; and a first Application Service Platform (ASP) to communicate with a second ASP of the second wireless communication device to setup a Peer-to-Peer (P2P) connection for an ASP-session using credentials of an ASP-P2P persistent group, the first ASP is to communicate with the second ASP a provision discovery request and a provision discovery response to set up the ASP session, the provision discovery response in response to the provision discovery request, wherein each of the provision discovery request and the provision discovery response includes a P2P interface address to be used during the session.

Example 28 includes the subject matter of Example 27 and optionally, wherein each of the provision discovery request and the provision discovery response includes an operating channel to be used within the ASP-P2P persistent group.

Example 29 includes the subject matter of Example 27 or 28 and optionally, wherein the first ASP is to communicate with the second ASP a P2P capability attribute including a group capability map, the group capability map includes a persistent group bit set to indicate the ASP-P2P persistent group.

Example 30 includes the subject matter of any one of Examples 27-29 and optionally, wherein the provision discovery request includes an indication of an intent to use the ASP-P2P persistent group, and the provision discovery response includes an indication of a confirmation to use the ASP-P2P persistent group.

Example 31 includes the subject matter of any one of Examples 27-30 and optionally, wherein the first ASP is to transmit the provision discovery request and to receive the provision discovery response, the provision discovery request to indicate the first ASP has the credentials available.

Example 32 includes the subject matter of any one of Examples 27-30 and optionally, wherein the first ASP is to receive the provision discovery request and to transmit the provision discovery response, the provision discovery response to indicate the first ASP has the credentials available.

Example 33 includes the subject matter of any one of Examples 27-32 and optionally, wherein the first ASP is to autonomously start the ASP-P2P persistent group as a group owner.

Example 34 includes the subject matter of any one of Examples 27-33 and optionally, wherein the ASP-session comprises a session over a Wireless-Fidelity (WiFi) Direct link.

Example 35 includes a method comprising setting up one or more Application Service Platform (ASP) Peer-to-Peer (P2P) (ASP-P2P) groups over a wireless communication link between a first ASP and a second ASP, the setting up including forming each ASP-P2P group only as an ASP-P2P persistent group extendable over a plurality of distinct sessions; and storing at the first ASP credentials of the ASP-P2P persistent group for use during the sessions.

Example 36 includes the subject matter of Example 35 and optionally, comprising communicating with the second ASP a P2P capability attribute including a group capability map, the group capability map includes a persistent group bit always set to indicate the ASP-P2P group is to be formed as the ASP-P2P persistent group.

Example 37 includes the subject matter of Example 35 or 36 and optionally, comprising communicating with the second ASP a provision discovery request and a provision discovery response to set up an ASP-P2P session, the provision discovery response in response to the provision discovery request, the provision discovery request including an indication of an intent to use the ASP-P2P persistent group, and the provision discovery response including an indication of a confirmation to use the ASP-P2P persistent group.

Example 38 includes the subject matter of Example 37 and optionally, comprising transmitting the provision discovery request and receiving the provision discovery response, the provision discovery request to indicate the first ASP has the credentials available.

Example 39 includes the subject matter of Example 37 and optionally, comprising receiving the provision discovery request and transmitting the provision discovery response, the provision discovery response to indicate the first ASP has the credentials available.

Example 40 includes the subject matter of any one of Examples 35-39 and optionally, comprising communicating with the second ASP a provision discovery request and a provision discovery response to set up an ASP-P2P session, the provision discovery response in response to the provision discovery request, wherein each of the provision discovery request and the provision discovery response includes a P2P interface address to be used within the ASP-P2P persistent group.

Example 41 includes the subject matter of any one of Examples 35-40 and optionally, comprising communicating with the second ASP a provision discovery request and a provision discovery response to set up an ASP-P2P session, the provision discovery response in response to the provision discovery request, wherein each of the provision discovery request and the provision discovery response includes an operating channel to be used within the ASP-P2P persistent group.

Example 42 includes the subject matter of any one of Examples 35-41 and optionally, comprising autonomously starting the ASP-P2P persistent group as a group owner.

Example 43 includes the subject matter of any one of Examples 35-42 and optionally, wherein the wireless communication link comprises a Wireless-Fidelity (WiFi) Direct link.

Example 44 includes a method comprising setting up one a Peer-to-Peer (P2P) connection for an ASP-session between a first Application Service Platform (ASP) and a second ASP, the ASP-session using credentials of an ASP-P2P persistent group, the setting up including communicating a provision discovery request and a provision discovery response between the first and second ASPs, the provision discovery response in response to the provision discovery request, wherein each of the provision discovery request and the provision discovery response includes a P2P interface address to be used during the session.

Example 45 includes the subject matter of Example 44 and optionally, wherein each of the provision discovery request and the provision discovery response includes an operating channel to be used within the ASP-P2P persistent group.

Example 46 includes the subject matter of Example 44 or 45 and optionally, comprising communicating a P2P capability attribute including a group capability map, the group capability map includes a persistent group bit set to indicate the ASP-P2P persistent group.

Example 47 includes the subject matter of any one of Examples 44-46 and optionally, wherein the provision discovery request includes an indication of an intent to use the ASP-P2P persistent group, and the provision discovery response includes an indication of a confirmation to use the ASP-P2P persistent group.

Example 48 includes the subject matter of any one of Examples 44-47 and optionally, comprising transmitting the provision discovery request and receiving the provision discovery response, the provision discovery request to indicate the first ASP has the credentials available.

Example 49 includes the subject matter of any one of Examples 44-47 and optionally, comprising receiving the provision discovery request and transmitting the provision discovery response, the provision discovery response to indicate the first ASP has the credentials available.

Example 50 includes the subject matter of any one of Examples 44-49 and optionally, comprising autonomously starting the ASP-P2P persistent group as a group owner.

Example 51 includes the subject matter of any one of Examples 44-50 and optionally, wherein the ASP-session comprises a session over a Wireless-Fidelity (WiFi) Direct link.

Example 52 includes a product including a non-transitory storage medium having stored thereon instructions that, when executed by a machine, result in setting up one or more ASP Peer-to-Peer (P2P) (ASP-P2P) groups over a wireless communication link between a first Application Service Platform (ASP) and a second ASP, the setting up including forming each ASP-P2P group only as an ASP-P2P persistent group extendable over a plurality of distinct sessions; and storing at the first ASP credentials of the ASP-P2P persistent group for use during the sessions.

Example 53 includes the subject matter of Example 52 and optionally, wherein the instructions result in communicating a P2P capability attribute including a group capability map, the group capability map includes a persistent group bit always set to indicate the ASP-P2P group is to be formed as the ASP-P2P persistent group.

Example 54 includes the subject matter of Example 52 or 53 and optionally, wherein the instructions result in communicating with the second ASP a provision discovery request and a provision discovery response to set up an ASP-P2P session, the provision discovery response in response to the provision discovery request, the provision discovery request including an indication of an intent to use the ASP-P2P persistent group, and the provision discovery response including an indication of a confirmation to use the ASP-P2P persistent group.

Example 55 includes the subject matter of Example 54 and optionally, wherein the instructions result in transmitting the provision discovery request and receiving the provision discovery response, the provision discovery request to indicate the first ASP has the credentials available.

Example 56 includes the subject matter of Example 54 and optionally, wherein the instructions result in receiving the provision discovery request and transmitting the provision discovery response, the provision discovery response to indicate the first ASP has the credentials available.

Example 57 includes the subject matter of any one of Examples 52-56 and optionally, wherein the instructions result in communicating a provision discovery request and a provision discovery response to set up an ASP-P2P session, the provision discovery response in response to the provision discovery request, wherein each of the provision discovery request and the provision discovery response includes a P2P interface address to be used within the ASP-P2P persistent group.

Example 58 includes the subject matter of any one of Examples 52-57 and optionally, wherein the instructions result in communicating a provision discovery request and a provision discovery response to set up an ASP-P2P session, the provision discovery response in response to the provision discovery request, wherein each of the provision discovery request and the provision discovery response includes an operating channel to be used within the ASP-P2P persistent group.

Example 59 includes the subject matter of any one of Examples 52-58 and optionally, wherein the instructions result in autonomously starting the ASP-P2P persistent group as a group owner.

Example 60 includes the subject matter of any one of Examples 52-59 and optionally, wherein the wireless communication link comprises a Wireless-Fidelity (WiFi) Direct link.

Example 61 includes a product including a non-transitory storage medium having stored thereon instructions that, when executed by a machine, result in setting up one a Peer-to-Peer (P2P) connection for an ASP-session between a first Application Service Platform (ASP) and a second ASP, the ASP-session using credentials of an ASP-P2P persistent group, the setting up including communicating a provision discovery request and a provision discovery response between the first and second ASPs, the provision discovery response in response to the provision discovery request, wherein each of the provision discovery request and the provision discovery response includes a P2P interface address to be used during the session.

Example 62 includes the subject matter of Example 61 and optionally, wherein each of the provision discovery request and the provision discovery response includes an operating channel to be used within the ASP-P2P persistent group.

Example 63 includes the subject matter of Example 61 or 62 and optionally, wherein the instructions result in communicating a P2P capability attribute including a group capability map, the group capability map includes a persistent group bit set to indicate the ASP-P2P persistent group.

Example 64 includes the subject matter of any one of Examples 61-63 and optionally, wherein the provision discovery request includes an indication of an intent to use the ASP-P2P persistent group, and the provision discovery response includes an indication of a confirmation to use the ASP-P2P persistent group.

Example 65 includes the subject matter of any one of Examples 61-64 and optionally, wherein the instructions result in transmitting the provision discovery request and receiving the provision discovery response, the provision discovery request to indicate the first ASP has the credentials available.

Example 66 includes the subject matter of any one of Examples 61-64 and optionally, wherein the instructions result in receiving the provision discovery request and transmitting the provision discovery response, the provision discovery response to indicate the first ASP has the credentials available.

Example 67 includes the subject matter of any one of Examples 61-66 and optionally, wherein the instructions result in autonomously starting the ASP-P2P persistent group as a group owner.

Example 68 includes the subject matter of any one of Examples 61-67 and optionally, wherein the ASP-session comprises a session over a Wireless-Fidelity (WiFi) Direct link.

Example 69 includes an apparatus comprising means for setting up one or more ASP Peer-to-Peer (P2P) (ASP-P2P) groups over a wireless communication link between a first Application Service Platform (ASP) and a second ASP, the setting up including forming each ASP-P2P group only as an ASP-P2P persistent group extendable over a plurality of distinct sessions; and means for storing at the first ASP credentials of the ASP-P2P persistent group for use during the sessions.

Example 70 includes the subject matter of Example 69 and optionally, comprising means for communicating a P2P capability attribute including a group capability map, the group capability map includes a persistent group bit always set to indicate the ASP-P2P group is to be formed as the ASP-P2P persistent group.

Example 71 includes the subject matter of Example 69 or 70 and optionally, comprising means for communicating a provision discovery request and a provision discovery response to set up an ASP-P2P session, the provision discovery response in response to the provision discovery request, the provision discovery request including an indication of an intent to use the ASP-P2P persistent group, and the provision discovery response including an indication of a confirmation to use the ASP-P2P persistent group.

Example 72 includes the subject matter of Example 71 and optionally, comprising means for transmitting the provision discovery request and means for receiving the provision discovery response, the provision discovery request to indicate the first ASP has the credentials available.

Example 73 includes the subject matter of Example 71 and optionally, comprising means for receiving the provision discovery request and transmitting the provision discovery response, the provision discovery response to indicate the first ASP has the credentials available.

Example 74 includes the subject matter of any one of Examples 69-73 and optionally, comprising means for communicating a provision discovery request and a provision discovery response to set up an ASP-P2P session, the provision discovery response in response to the provision discovery request, wherein each of the provision discovery request and the provision discovery response includes a P2P interface address to be used within the ASP-P2P persistent group.

Example 75 includes the subject matter of any one of Examples 69-74 and optionally, comprising means for communicating a provision discovery request and a provision discovery response to set up an ASP-P2P session, the provision discovery response in response to the provision discovery request, wherein each of the provision discovery request and the provision discovery response includes an operating channel to be used within the ASP-P2P persistent group.

Example 76 includes the subject matter of any one of Examples 69-75 and optionally, comprising means for autonomously starting the ASP-P2P persistent group as a group owner.

Example 77 includes the subject matter of any one of Examples 69-76 and optionally, wherein the wireless communication link comprises a Wireless-Fidelity (WiFi) Direct link.

Example 78 includes an apparatus comprising means for setting up one a Peer-to-Peer (P2P) connection for an ASP-session between a first Application Service Platform (ASP) and a second ASP, the ASP-session using credentials of an ASP-P2P persistent group, the means for setting up including means for communicating a provision discovery request and a provision discovery response between the first and second ASPs, the provision discovery response in response to the provision discovery request, wherein each of the provision discovery request and the provision discovery response includes a P2P interface address to be used during the session.

Example 79 includes the subject matter of Example 78 and optionally, wherein each of the provision discovery request and the provision discovery response includes an operating channel to be used within the ASP-P2P persistent group.

Example 80 includes the subject matter of Example 78 or 79 and optionally, comprising means for communicating a P2P capability attribute including a group capability map, the group capability map includes a persistent group bit set to indicate the ASP-P2P persistent group.

Example 81 includes the subject matter of any one of Examples 78-80 and optionally, wherein the provision discovery request includes an indication of an intent to use the ASP-P2P persistent group, and the provision discovery response includes an indication of a confirmation to use the ASP-P2P persistent group.

Example 82 includes the subject matter of any one of Examples 78-81 and optionally, comprising means for transmitting the provision discovery request and means for receiving the provision discovery response, the provision discovery request to indicate the first ASP has the credentials available.

Example 83 includes the subject matter of any one of Examples 78-81 and optionally, comprising means for receiving the provision discovery request and means for transmitting the provision discovery response, the provision discovery response to indicate the first ASP has the credentials available.

Example 84 includes the subject matter of any one of Examples 78-83 and optionally, comprising means for autonomously starting the ASP-P2P persistent group as a group owner.

Example 85 includes the subject matter of any one of Examples 78-84 and optionally, wherein the ASP-session comprises a session over a Wireless-Fidelity (WiFi) Direct link.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A product comprising one or more tangible computer-readable non-transitory storage media comprising computer-executable instructions operable to, when executed by at least one computer processor, enable the at least one computer processor to implement operations at a first Application Service Platform (ASP) on a first wireless device, the operations comprising:
    allowing the first ASP to form an ASP Peer-to-Peer (P2P) (ASP-P2P) group with a second ASP of a second wireless device only as a persistent P2P group extendable over a plurality of distinct ASP sessions;
    sending a provision discovery request from the first ASP to the second ASP, the provision discovery request comprising an indication of an intent to use an ASP-P2P persistent group, and a P2P interface address attribute;
    processing a provision discovery response from the second ASP, the provision discovery response comprising an indication of a confirmation to use the ASP-P2P persistent group; and
    using the ASP-P2P persistent group to communicate between the first ASP and the second ASP during one or more of the plurality of distinct ASP sessions.

2. The product of claim 1, wherein the provision discovery request comprises an operating channel to be used by the ASP-P2P persistent group.

3. The product of claim 1, wherein the operations comprise storing credentials of said ASP-P2P persistent group.

4. The product of claim 1, wherein the operations comprise, during formation of the ASP-P2P group, setting a persistent P2P group bit of a group capability map in a P2P capability attribute only to a predefined value to indicate that the ASP-P2P group is to be formed as the persistent P2P group.

5. The product of claim 4, wherein the predefined value is one.

6. The product of claim 1, wherein the first ASP is a Group Owner (GO) of the ASP-P2P persistent group.

7. The product of claim 1, wherein the operations comprise autonomously starting said ASP-P2P persistent group as a group owner (GO).

8. A first wireless device comprising:
    at least one processor; and
    at least one non-transitory storage medium to store logic configured to, when executed by said processor, cause a first Application Service Platform (ASP) on said first wireless device to:
        allow the first ASP to form an ASP Peer-to-Peer (P2P) (ASP-P2P) group with a second ASP of a second wireless device only as a persistent P2P group extendable over a plurality of distinct ASP sessions;
        send a provision discovery request from the first ASP to the second ASP, the provision discovery request comprising an indication of an intent to use an ASP-P2P persistent group, and a P2P interface address attribute;
        process a provision discovery response from the second ASP, the provision discovery response comprising an indication of a confirmation to use the ASP-P2P persistent group; and
        use the ASP-P2P persistent group to communicate between the first ASP and the second ASP during one or more of the plurality of distinct ASP sessions.

9. The first wireless device of claim 8, wherein the provision discovery request comprises an operating channel to be used by the ASP-P2P persistent group.

10. The first wireless device of claim 8, wherein the logic, when executed by said processor, is to cause the first ASP to store credentials of said ASP-P2P persistent group.

11. The first wireless device of claim 8, wherein the logic, when executed by said processor, is to cause the first ASP to, during formation of the ASP-P2P group, set a persistent P2P group bit of a group capability map in a P2P capability attribute only to a predefined value to indicate that the ASP-P2P group is to be formed as the persistent P2P group.

12. The first wireless device of claim 11, wherein the predefined value is one.

13. The first wireless device of claim 8, wherein the first ASP is a Group Owner (GO) of the ASP-P2P persistent group.

14. The first wireless device of claim 8, wherein the logic, when executed by said processor, is to cause the first ASP to autonomously start said ASP-P2P persistent group as a group owner (GO).

15. The first wireless device of claim 8 comprising a radio to transmit said provision discovery request, and to receive said provision discovery response.

16. The first wireless device of claim 8 comprising one or more antennas.

17. The first wireless device of claim 8 comprising a mobile device.

18. A method to be performed by a first Application Service Platform (ASP) on a first wireless device, the method comprising:
    allowing the first ASP to form an ASP Peer-to-Peer (P2P) (ASP-P2P) group with a second ASP of a second wireless device only as a persistent P2P group extendable over a plurality of distinct ASP sessions;
    sending a provision discovery request from the first ASP to the second ASP, the provision discovery request comprising an indication of an intent to use an ASP-P2P persistent group, and a P2P interface address attribute;

processing a provision discovery response from the second ASP, the provision discovery response comprising an indication of a confirmation to use the ASP-P2P persistent group; and using the ASP-P2P group to communicate between the first ASP and the second ASP during one or more of the plurality of distinct ASP sessions.

19. The method of claim 18, wherein the provision discovery request comprises an operating channel to be used by the ASP-P2P persistent group.

20. The method of claim 18 comprising, during formation of the ASP-P2P group, setting a persistent P2P group bit of a group capability map in a P2P capability attribute only to a predefined value to indicate that the ASP-P2P group is to be formed as the persistent P2P group.

21. The method of claim 18, wherein the first ASP is a Group Owner (GO) of the ASP-P2P persistent group.

* * * * *